Feb. 25, 1930.　　M. W. GOLDBERG　　1,748,124
SAND HANDLING AND MOLDING APPARATUS
Filed Dec. 17, 1928　　4 Sheets-Sheet 1
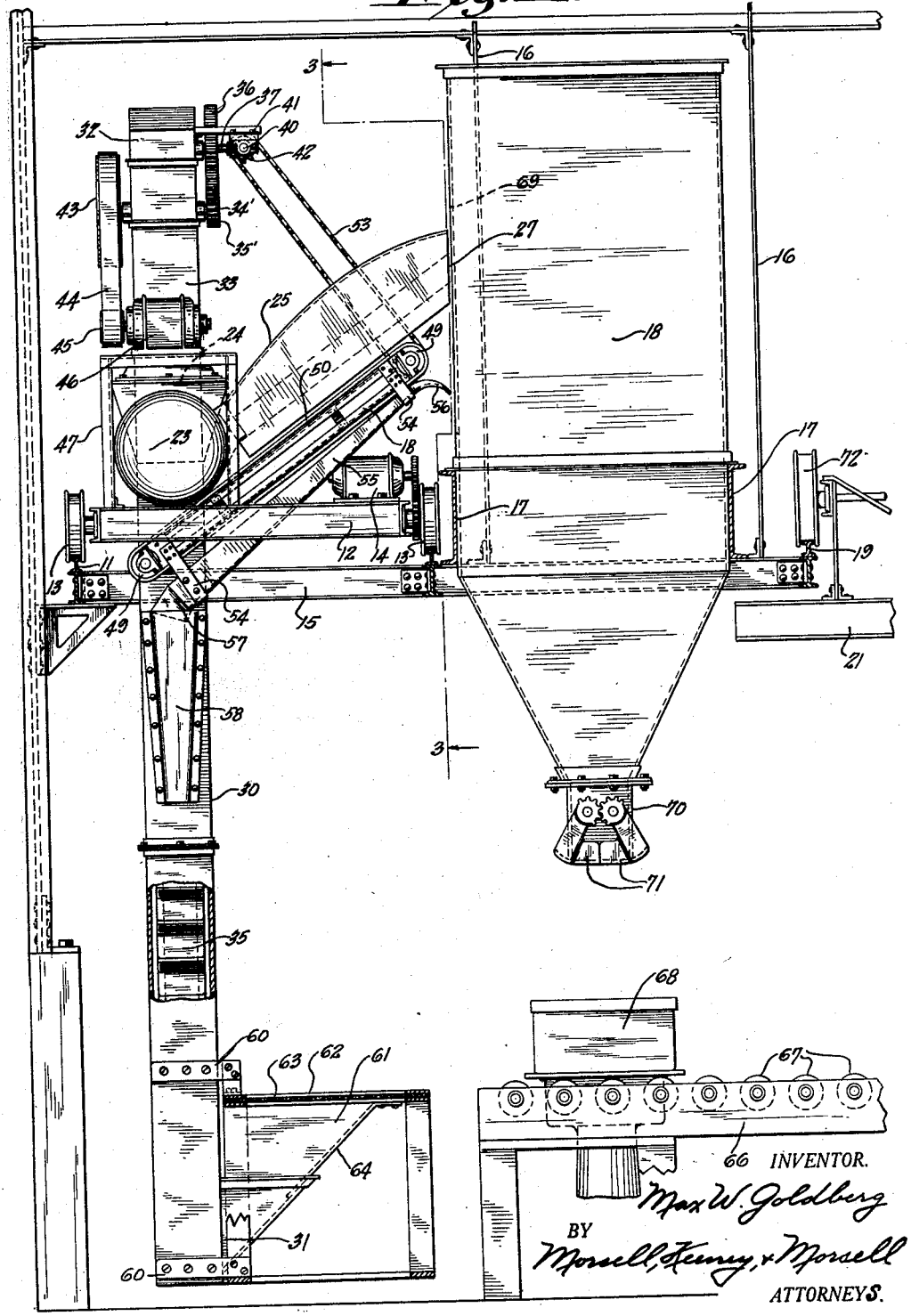
INVENTOR.
Max W. Goldberg
BY
Morsell, Henry, & Morsell
ATTORNEYS.

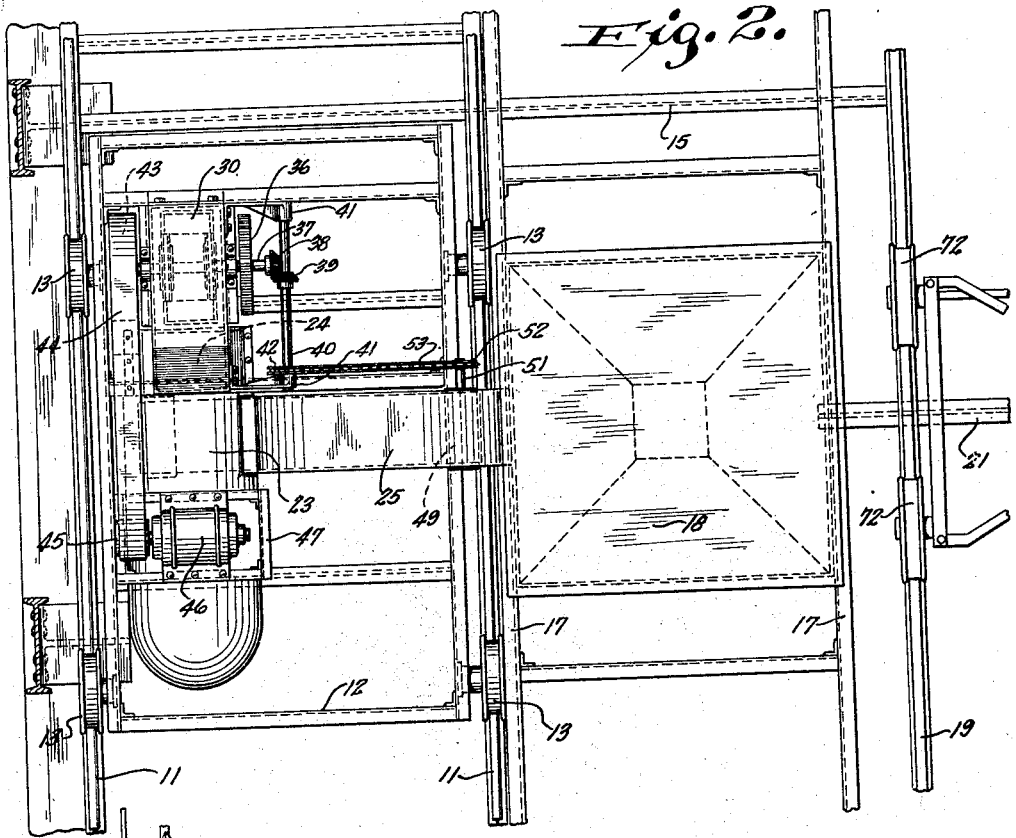
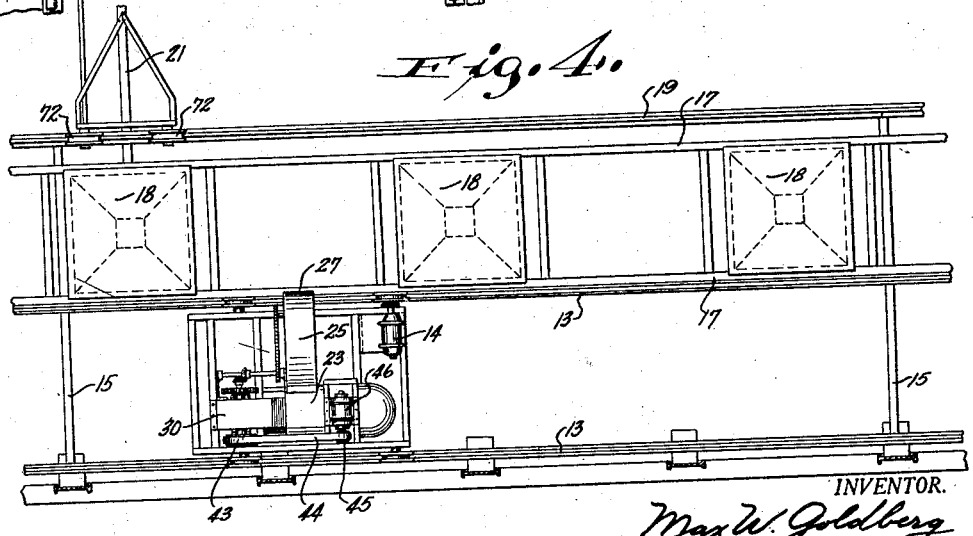

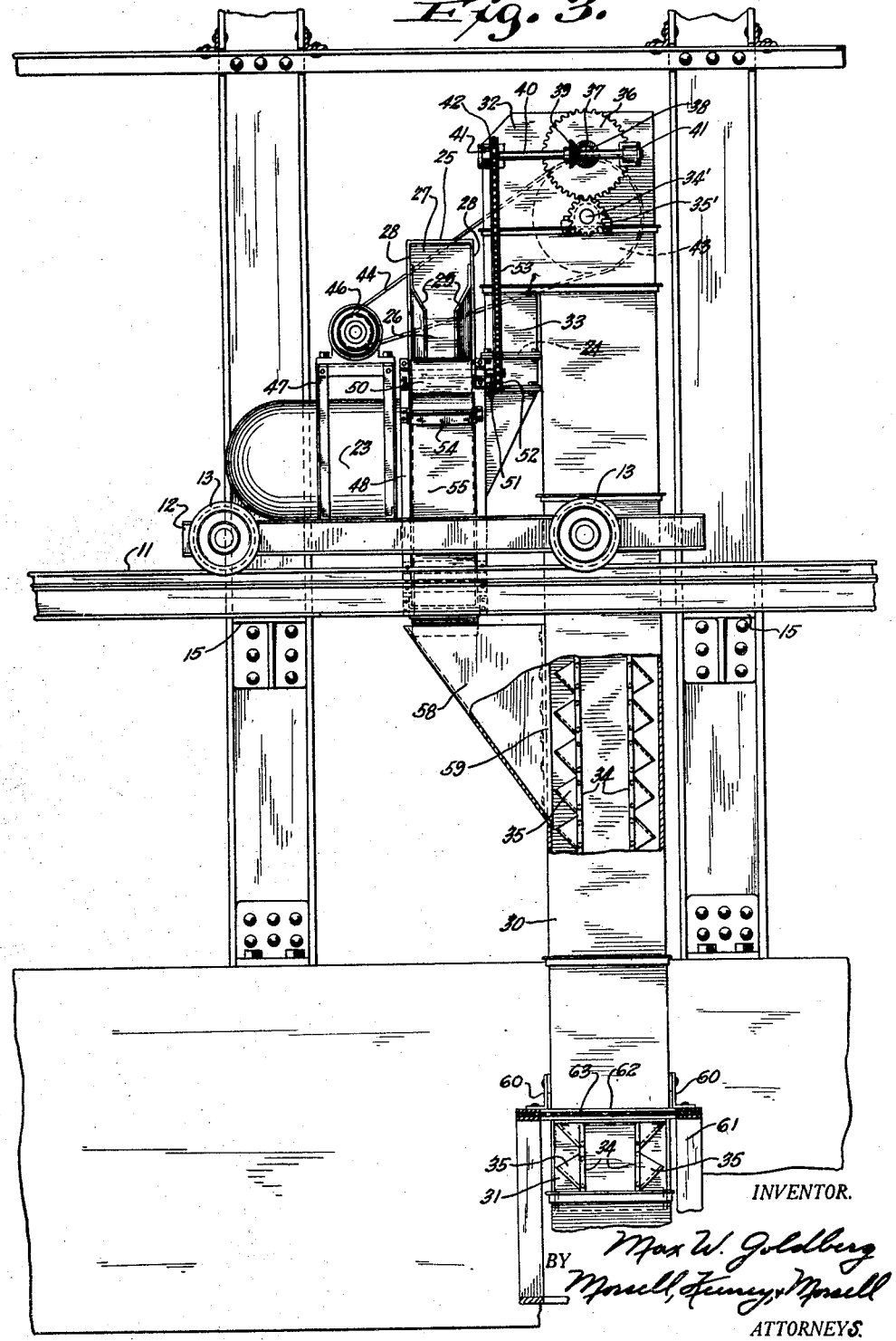

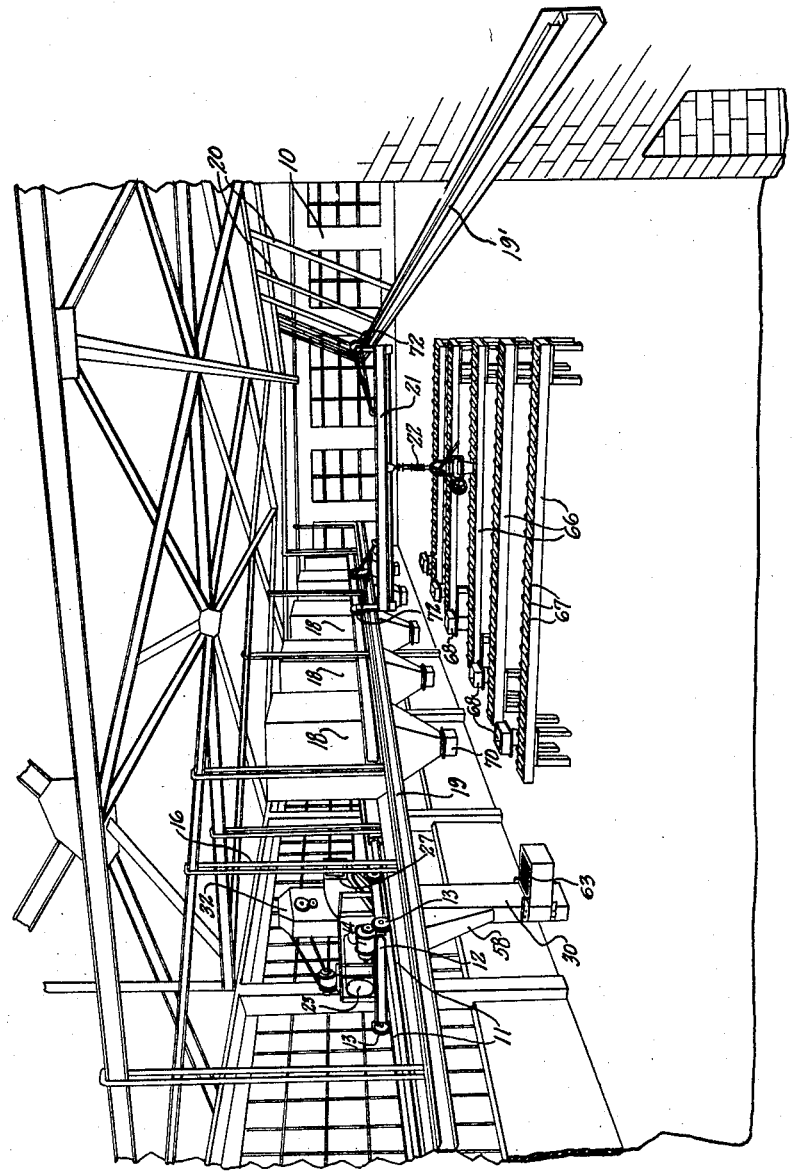

Patented Feb. 25, 1930

1,748,124

UNITED STATES PATENT OFFICE

MAX W. GOLDBERG, OF PORT WASHINGTON, WISCONSIN, ASSIGNOR TO MODERN POURING DEVICE COMPANY, OF PORT WASHINGTON, WISCONSIN, A CORPORATION OF WISCONSIN

SAND HANDLING AND MOLDING APPARATUS

Application filed December 17, 1928. Serial No. 326,448.

This invention relates to improvements in sand handling and molding apparatus.

It is common practice in foundries, after the sand is shaken from the castings and molds, to deposit said sand in a heap on the floor and to stir it up either by hand or by machine to free the gases therefrom, and to break up and disintegrate the lumps so that it is in proper condition for reuse. The sand is then transferred to the molds, or to overhead hoppers ready to be discharged into the molds. This operation requires considerable handling which consumes time and labor.

It is one of the objects of this invention to obviate the above-mentioned objections by providing an improved sand handling and molding apparatus in which the handling of the sand and the operations attendant thereupon are accomplished almost entirely by mechanical means.

It is a further object of this invention to provide an improved sand handling and molding apparatus in which a plurality of discharge hoppers are employed, and in which a portable sand elevator and conditioner unit is adapted to travel adjacent said hoppers to discharge selectively into any one of them.

A further object of this invention resides in the provision of an improved sand handling and molding apparatus including a row of stationary hoppers, a movable elevator and sand conditioning unit adapted to discharge selectively into said hoppers, conveyors adjacent each hopper for handling the molds, and a pouring device supported by an overhead crane and adapted to selectively pour molds positioned adjacent any of said hoppers, all of said parts cooperating with one another to carry out a continuous process of pouring, molding, elevating the used sand, reconditioning said sand, and delivering it to a hopper ready for reuse.

It is a further object of this invention to provide an improved sand handling and molding apparatus in which a plurality of hoppers and a movable elevator and conditioner unit are employed, which permit the sand to be prepared specially for each hopper, according to the use to which it is to be put, certain types of molding requiring a sand which is more moist or of different composition and texture than is required for other types of molding.

A further object of this invention is to provide an improved sand handling and molding apparatus in which means is provided for intercepting sand which falls as it is being discharged from the conditioner unit into a hopper, the said means conveying said fallen sand into the hopper or back into the elevator.

With the above and other objects in view, the invention consists of the improved sand handling and molding apparatus and all its parts and combinations as set forth in the claims, and all equivalents thereof.

In the accompanying drawing, in which the same reference numerals designate the same parts in all of the views:

Fig. 1 is a side elevation of a portion of the improved apparatus, parts being broken away;

Fig. 2 is a plan view of the apparatus shown in Fig. 1, parts being broken away;

Fig. 3 is a sectional view taken on line 3—3 of Fig. 1, parts being broken away;

Fig. 4 is a plan view showing a row of hoppers, and the portable elevator unit positioned adjacent said hoppers; and Fig. 5 is a perspective view of the interior of a foundry showing the complete sand handling and molding apparatus as installed.

Referring to the drawings, the numeral 10 designates a foundry room, the said room being provided near one side and intermediate of the height of the room with longitudinally extending tracks 11 for receiving a truck 12, the latter being supported by wheels 13 which ride on the tracks 11. The truck is arranged to be propelled by an electric motor 14. The said tracks rest upon transverse beams 15 which are supported preferably from the ceiling by members 16. Also resting upon the transverse beams are longitudinally extending beams 17 between which a plurality of hoppers 18 are positioned at intervals.

Extending adjacent the hoppers, and connected to the transverse beams 15, is a track 19, and spaced a considerable distance from said track and running parallel thereto, is a second track 19', supported from the ceiling by members 20. The tracks 19 and 19' are adapted to receive a travelling crane 21, from which a pouring device 22 is suspended.

Positioned upon the truck 14 is a sand conditioning device 23 which is of a standard type, and which is adapted to receive sand deposited in an opening 24. The said sand which is thoroughly aerated and broken up by the machine is discharged by means of the chute 25 in a perfect condition ready for use. The chute 25, which is a standard part of conditioning devices, has its lower portion 26 open (see Fig. 3), and has an open discharge end 27. Mounted on the inner surface of each of the sides 28 of the chute, are guides 29 which extend obliquely inwardly as shown in Fig. 3.

Connected to the truck 14, and extending both above and below it, is a sand elevator 30. The lower end of the elevator is maintained slightly above the floor, so that the elevator may move readily with the truck. It may, however, move below the floor in a pit. The elevator comprises an outer casing formed with a lower intake opening 31 and with an enlarged upper portion 32 connecting with a spout portion 33. The spout is connected with the opening 24 of the conditioning device to discharge sand thereinto.

Movable within the elevator is an endless chain 34 having a plurality of sand carrying buckets 35 connected thereto. The said buckets are arranged to convey sand from the intake 31 of the elevator to the discharge spout 33. The chain 34 is mounted on upper and lower sprockets (not shown), the upper sprocket being driven by a shaft 34'. On one end of the latter shaft is a gear 35' meshing with a larger gear 36 mounted rigidly on a shaft 37. Mounted also on the shaft 37 is a bevel gear 38, which meshes with a bevel gear 39 on a shaft 40, the latter being journaled in bearings 41, at right angles to the shaft 37. The shaft 40 carries a rigidly mounted sprocket wheel 42. On the other end of the shaft 34 is a pulley 43 which is connected by an endless belt 44 with a pulley 45 on a driving motor 46. The motor is mounted on a platform 47 on the truck.

Secured at an angle to the truck is a frame 48, at each end of which rollers 49 are journaled. An endless belt 50 is movable over said rollers. The endless belt extends above the truck directly beneath the open lower portion 26 of the chute 25, and it also extends a short distance below the truck. The shaft 51, of the upper roller 49, extends outwardly at one side and is provided with a rigidly mounted ratchet wheel 52. The said ratchet wheel is connected by an endless chain 53 with the ratchet wheel 42 to drive the endless belt 50.

U-shaped supporting members 54, secured to each side of the frame 48, extend downwardly therefrom to support a chute 55. The said chute has its upper end curved downwardly as at 56, and has its lower end curved downwardly as at 57 to discharge into a receiving member 58 extending from the side of the elevator and communicating with an opening 59 therein.

Supported from the lower end of the elevator 30 by brackets 60 is a screen box 61 having an upper opening 62 covered by screening 63. Material discharged into said opening is directed by the inclined surface 64 into the intake opening 65 of the elevator. The said screen is preferably of the shaker type such as is now on the market.

Positioned transversely of the foundry room are a plurality of conveyors 66 provided with rollers 67 on their upper surface. One of said conveyors is preferably provided for each hopper as shown in Fig. 5. Positioned beneath each hopper 18 and adjacent the end of each conveyor is a molding machine 68.

The hoppers 18 are of a standard type and are provided with an intake opening 69 and with a discharge spout 70, the said spout being controlled by doors 71.

The crane 21 is also of a standard type, and comprises a transverse member at each end of which are wheels 72 which ride on the tracks 19 and 19'. The pouring device 22, which is suspended from the crane, is movable longitudinally on said crane.

The operation of the device is as follows: A mold, containing a pattern (not shown) is placed in one of the molding machines 68, and sand is discharged into the mold by the hopper 18 positioned above. The mold is then placed upon the adjacent conveyor 66 and rolled along toward the center of the room. The crane 21 is then operated to bring the pouring device 22, containing molten metal, over the mold. Next, the mold is poured and allowed to stand for a short time, and it is then rolled back toward the end of the conveyor. The motor 14 of the truck 12 is then operated to move the elevator and conditioner unit adjacent the conveyor, and the mold is removed onto the screen 63. If no motor is used on the truck the latter may be moved by hand. The mold is then broken open, and the sand, which is freed, falls through the screen, and is directed by the inclined portion 64 into the elevator opening 31.

The motor 46 is then started to operate the endless chain 34 carrying the buckets 35, and the latter convey the sand upwardly and discharge it into the opening 24 of the sand conditioning machine 23. The said machine frees the gases from the used sand, breaks up and disintegrates the lumps, moistens it and thoroughly prepares it for reuse. The conditioned sand is then discharged by the chute 25 into the hopper opening 69. Some of the sand from the conditioner naturally falls through the open lower portion 44 of the chute. The said sand is received by the endless belt 50, and is conveyed over the upper roller 49 onto the end 56 of the chute 55, the said end directing the fallen sand into the hopper opening. Some sand adheres to the belt 50, and this sand falls from the lower side of the belt onto the chute 55, which directs it into the receiving member 58 back into the elevator. Thus, by means of the endless belt 50 and the chute 55, absolutely no sand is permitted to fall to the floor. The conditioned sand, which has been discharged into the hopper, is now ready for use in filling additional molds.

By means of the portable truck 14 the elevator and conditioner unit may be readily moved adjacent any one of the hoppers. A further important features of advantage in the portable unit resides in the fact that if it is necessary to have sand of a different moisture for each hopper, this may be readily taken care of. When the elevator is stopped adjacent a particular hopper, the sand directed into the opening 31 may be moistened to suit the particular requirement. When the elevator is stopped adjacent another hopper, more moisture may be added if necessary. Thus by having the unit portable, only one elevator and conditioner are necessary to discharge into any one of a number of hoppers the exact type of sand required for said hopper. Thus one unit is made to do the same work which would be accomplished if there were a stationary unit for each hopper.

From the foregoing description it may be seen that by employing a portable elevator and sand conditioning unit, an economical and comparatively simple installation is provided which is adapted to take care of a large volume of work. It may further be seen that the entire combination of the portable unit, hoppers, conveyors, and the portable pouring device cooperate to carry out, in an efficient manner, the entire foundry procedure, resulting in a material saving of both time and labor.

What I claim is:

1. A material handling apparatus comprising a plurality of overhead receptacles, an overhead support adjacent said receptacles, and an elevator unit having endless elevating means therein movable along said overhead support for lifting material fed into its lower end and for discharging the same into a predetermined receptacle.

2. A sand handling device comprising a horizontally movable frame, elevating mechanism within said frame, a sand conditioning device adjacent the upper portion of said elevating mechanism, and means in connection with said sand conditioning device for discharging the elevated and conditioned sand when said frame has been horizontally moved to a predetermined point.

3. A sand handling apparatus comprising an overhead receptacle, an elevator and sand conditioning unit movably mounted with respect to said receptacle, and means for discharging the elevated and conditioned sand into the receptacle.

4. A sand handling apparatus comprising a plurality of overhead receptacles, an elevator and sand conditioning unit movably mounted adjacent said receptacles, and means in connection with said unit for discharging the elevated and conditioned sand when the unit has been positioned adjacent a predetermined receptacle.

5. A sand handling apparatus comprising a plurality of overhead receptacles, an overhead support adjacent said receptacles, an elevator and sand conditioning unit movable along said overhead support, and means in connection with said unit for discharging the elevated and conditioned sand when the unit has been positioned adjacent a predetermined receptacle.

6. A sand handling apparatus comprising a plurality of overhead receptacles, an overhead track adjacent said receptacles, an elevator and sand conditioning unit movable along said track, and means in connection with said unit for discharging the elevated and conditioned sand when the unit has been positioned adajacent a predetermined receptacle.

7. A sand handling apparatus comprising a plurality of overhead receptacles, an overhead track adjacent said receptacles, a truck movable on said track, an elevator connected to said truck, a sand conditioning device mounted on the truck for receiving sand lifted by the elevator, and means in connection with the conditioning device for discharging said sand when the truck is positioned adjacent a predetermined receptacle.

8. A sand handling apparatus comprising a plurality of overhead receptacles, an overhead track adjacent said receptacles, a truck movable on said track, an elevator having endless lifting mechanism therein connected to said truck, a sand conditioning device mounted on the truck for receiving sand lifted by the elevator, and means in connection with the conditioning device for discharging said sand when the truck is positioned adjacent a predetermined receptacle.

9. A sand handling apparatus comprising a plurality of overhead receptacles, an elevator and sand conditioning unit movably mounted adjacent said receptacles, electric motor means for propelling said unit to position it adjacent a predetermined receptacle, and means in connection with said unit for discharging the elevated and conditioned sand into said receptacle.

10. A material handling apparatus comprising a plurality of overhead receptacles, an elevator unit having a material receiving opening movable adjacent said receptacles for lifting material fed into said receiving opening and for discharging the same into a predetermined receptacle, and a screen positioned adjacent the receiving opening of the elevator unit and movable with the unit.

11. A sand handling apparatus for discharging sand into a receptacle, comprising a sand conditioning device, said sand conditioning device having a discharging member for directing material into the receptacle, and means positioned below said discharging member for intercepting sand which has fallen therefrom without going into the receptacle and for directing said fallen sand into the receptacle.

12. A sand handling apparatus for discharging sand into a receptacle, comprising a sand conditioning device, said sand conditioning device having a discharging member for directing material into the receptacle, and endless belt means positioned below said discharging member for intercepting sand which has fallen therefrom without going into the receptacle and for directing said fallen sand into the receptacle.

13. A sand handling apparatus for discharging sand into an overhead receptacle, comprising an elevator and sand conditioning unit, a discharge member in connection with said unit for directing sand into the receptacle, and means positioned below said discharge member for intercepting sand which has fallen therefrom without going into the receptacle and for directing some of said fallen sand into the receptacle and some back into the elevator.

14. A sand handling apparatus for discharging sand into an overhead receptacle, comprising an elevator and sand conditioning unit, a discharge member in connection with said unit for directing sand into the receptacle, an endless belt movable below said discharge member for intercepting sand which has fallen from the discharge member without going into the receptacle and for directing some of said sand into the receptacle, and a chute below said endless belt and communicating with the elevator unit, for directing the rest of said fallen sand back into the elevator unit.

In testimony whereof, I affix my signature.

MAX W. GOLDBERG.